United States Patent Office 2,785,065
Patented Mar. 12, 1957

2,785,065
METHOD OF PRODUCING METALS FROM THEIR HALIDES

Frank H. Spedding, Harley A. Wilhelm, and Wayne H. Keller, Ames, Iowa, assignors to the United States of America as represented by the United States Atomic Energy Commission No Drawing. Application November 14, 1945,
Serial No. 628,653

3 Claims. (Cl. 75—84.4)

This application relates to the production of metallic beryllium and metallic beryllium compositions.

The present process provides a method for production of beryllium in molten state under conditions such that formation of oxide due to reaction of the resulting metal with the atmosphere is substantially minimized.

In performance of this process a reducing metal of the group consisting of alkali metals and alkaline earth metals such as sodium, potassium, lithium, calcium, barium, strontium or magnesium (usually in amount 5 to 10% or more in excess of stoichiometric quantity) is reacted with a fluoride or other halide of beryllium at a temperature above the melting point of the metallic beryllium composition formed or at sufficiently high temperature to form a molten metal phase and the resulting reaction mass is maintained in molten state for a time sufficient to permit separation of the molten pool of metal from the resulting slag which comprises a fluoride of the reducing metal. This pool of metal may be withdrawn while the metal is molten or the pool may be allowed to solidify and separated from the slag thereafter. Frequently the separation of metal from the slag is very incomplete.

In accordance with the present invention we have found that especially good separation of slag and metal and improved yields may be secured through use of calcium and magnesium as joint reducing metals. Simultaneous use of both metals results in substantially improved operation. In conducting the reaction it is found desirable to establish a superatmospheric pressure while the reaction process is proceeding in order to maintain the reducing metal more or less uniformly dispersed throughout the reaction mass and thereby to ensure production of beryllium in comparatively high yield. Where metal of high purity is desired the pressure may be released after substantial reaction has occurred and many of the impurities distilled from the molten metal. Alternatively, the molten metal may be allowed to be solidified and subsequently may be remelted and impurities distilled therefrom.

Particularly advantageous results may be secured if the reaction is conducted in an elongated reactor of such length (usually three or more times its width) that the molten pool of metal or slag and metal will have a reduced interfacial area in order to minimize heat loss and consequent premature cooling. Moreover, it is found especially advantageous to utilize a reactor which is provided with a refractory lining or interior surface comprising a refractory compound, preferably an oxide, of a metal above beryllium in the electromotive series. Further details of the specific reactor which has been found advantageous will be supplied hereinafter.

In accordance with a further embodiment of this invention, it has been found that the necessary heat required to ensure layer separation may be developed internally by conducting an auxiliary exothermic reaction in the reaction mixture of the beryllium fluoride or other beryllium halide and the reducing metal. For example, an additional halide of another metal below the reducing metal, and usually below beryllium in the electromotive series, may be added to the reaction mixture and the amount of reducing metal (calcium, magnesium, sodium etc.) increased accordingly. In such a case heat evolved from the auxiliary reaction aids in the establishment of the temperature required and/or lowers the melting point of the metal phase and/or slag so that the layer separation may be secured. A particularly advantageous result may be obtained by a reduction of a mixture of the beryllium fluoride and a chloride of the other metal since in such a case the fluidity of the resulting slag is sufficiently high to permit very efficient separation of metal therefrom and consequently, the resulting metal is secured in high yield and good purity. Various metals may be co-reduced with the beryllium metal by this process. The process may be particularly advantageously carried out by using a halide of a metal which will be readily separable from the beryllium. For example, metals such as zinc, cadmium, mercury and other metals of low boiling point may be distilled from beryllium thus permitting the production of this metal in high purity. On the other hand, some metals such as lead are immiscible and separate during the co-reduction.

This process is also advantageous where alloys of beryllium are to be produced. For example, thorium-beryllium, beryllium-aluminum, beryllium-zinc, uranium-beryllium etc. alloys may be produced in this manner. The relative proportions of beryllium to other metals may be adjusted within comparatively wide limits in accordance with results desired; however, the quantity of other metal halide used should be balanced so as to avoid production of a metallic mixture having approximately the same density as the slag.

In accordance with the present invention other auxiliary exothermic reactions, capable of developing a temperature higher than the melting point of the metal being produced, can be used in conjunction with the reduction process herein contemplated. For example, halogenating agents such as iodine, bromine, chlorine, hypochlorites etc., sulphur or oxidizing salts such as chlorates, perchlorates, bromates, persulphates or similar salts of alkali or alkaline earth metals may be introduced in the reaction mixture and the reducing metal (calcium etc.) concentration in the mixture increased accordingly. Many of these auxiliary compounds, which may be termed "boosters," serve to aid in the formation of a more fluid slag or reaction mass at the operating temperature and thereby to facilitate separation of the metal therefrom.

The reaction may be conducted in a metallic reactor usually constructed of iron or steel and preferably lined with a resistant refractory of an alkaline earth metal oxide or mixture of such oxides. The problem of securing a satisfactory lining is of paramount importance. The beryllium formed under this process tends to attack and penetrate iron or steel reactors. In consequence, should the lining become defective during the operation, the metal tends to flow through the defect to the metal wall of the reactor, and to penetrate the wall thus creating an exceedingly hazardous condition due to the fact that the molten metal flowing through the opening created in the wall reacts violently with the air.

The problem of securing suitable linings for bombs or other reactors used in this process has been rather complex due to the high reactivity of the metals produced. Silicates have been found to be unsuitable because they react with the alkaline earth metals and contaminate the product with silicon. Applicants have found alkaline earth metal oxides to be highly effective lining materials.

The lining may be deposited upon the walls of the reactor by any convenient means. In accordance with one process described in a copending application of Harley A. Wilhelm, Serial No. 567,284, filed December 8, 1944, an elongated cylindrical bomb, provided with a centrally disposed mandrel of the size required for the reaction zone is filled with finely powdered anhydrous magnesium oxide, calcined dolomite, calcium oxide or similar oxide and the bomb subjected to a jolting action whereby the powder becomes compacted into an inherent well-bonded lining.

As previously noted, the process may be effectively conducted in an elongated reactor having a length at least three times its width or diameter since use of such a reactor permits ready establishment of a temperature gradient decreasing from the bottom to the top of the reactor. A cylindrical pipe or shell provided with top and bottom closed ends is suitable. These closed ends may be sealed if desired although in general it is found preferable to mount the top or covering end upon the cylinder in a manner such that a minor amount of leakage can take place, so that the pressure in the reactor during the reaction does not become excessive. The amount of leakage permitted, however, should not be so great as to prevent establishment of a superatmosphere pressure within the reaction by the reaction. A flange cover fitted to the top end of the reactor without a gasket provides a sufficiently tight fit.

The reactants should be anhydrous and substantially free from moisture or oxide. Generally speaking, the oxygen content of the reaction mixture should not exceed about 1 percent by weight. The reactants should be thoroughly mixed prior to introduction and in order to secure satisfactory mixing the reducing metal should be finely divided (generally about minus 10 to minus 50 mesh). In most cases the fluoride undergoing reduction may be much finer, usually being largely minus 200 mesh in particle size. Following addition of the reaction mixture to the lined reactor, a cover of the lining material is provided and the reactor is closed. The reaction is initiated by preheating until the reaction mixture or a major portion of it has been heated to the temperature at which reaction will take place, or where preheating is unnecessary the reaction may be initiated by means of an electrical fuse. This fuse may comprise a short length of resistance wire attached to a suitable source of electrical power and functions by heating a localized portion of the mixture to the temperature at which reaction is initiated (usually about 400 to 600° C.). After reaction has been initiated substantial pressure may develop within the system due to vaporization of the reducing metal and to the fact that escape of the metal is prevented or substantially minimized. The pressure developed in general exceeds ½ to 3 atmospheres gauge and in most cases is of the order of 75 to several hundred pounds per square inch gauge. This serves to maintain the reducing metal more or less uniformly dispersed throughout the reaction mixture as reaction proceeds. This facilitates substantially complete reaction of the halide salts and also tends to prevent reversal of the reaction at the elevated temperature due to back reaction of the resulting metal with the calcium oxide or other oxide of the liner. Moreover, the pressure established minimizes or prevents inleakage of air or moisture into the reactor.

When a bomb or reactor of elongated construction as herein described is used, particularly advantageous results accrue due to the fact that the reaction may be initiated in one end of the bomb by heating or other means and that thereby a temperature differential may be established in which one end of the reactor is above the melting point of the metal phase produced and the other end of the reactor is maintained below the boiling point of the reducing metal and frequently being at a temperature several hundred degrees below that of the opposed end. This is found to be advantageous since it effectively minimizes establishment of excessive pressures in the reactor. Furthermore, after reaction is over or begins to subside and cooling of the reactor begins to occur distillation of the reducing metal from the molten mass takes place and this metal condenses in the cooler end of the bomb. Thus the temperature differential established permits substantial purification of the metal by removal of reducing metal, halides and other impurities as it is being cooled to solid state.

After reaction is completed the molten mass is maintained in molten state until the metal has substantially completely separated from the slag. Usually this requires one or several minutes. Thereafter the metal may be allowed to solidify into a solid billet or it may be withdrawn from the reactor in molten state.

The resulting metal is comparatively free from impurities although it may contain small amounts, for example, one or several percent, magnesium, calcium or other reducing metal which has been used to effect the reaction. Further, where a booster such as zinc chloride, iodine etc. is used the metal obtained may be contaminated with the booster or its reaction product. Further impurities may be present due to the use of reactants which are impure and in addition some beryllium oxide may be present due to partial reaction of the beryllium with the lining and/or to the presence of a residual amount of water in the mixture or reactor lining.

As previously stated, a substantial purification of the metal may be secured by heating the metal at a temperature at which it is molten in vacuo. In order to secure a satisfactory purification and prevent further oxidation or contamination of the metal, this treatment is preferably conducted in a closed crucible or melting chamber constructed of graphite or similar inert material and the absolute pressure established within the crucible is generally below about 1 to 2 millimeters of mercury frequently being of the order of 100 to 200 microns. Impurities such as magnesium, calcium or other alkaline earth metal, sodium, potassium or other alkali metal, boron, cadmium, zinc or other metals, phosphorus, sulphur and halogens are removed to a very substantial degree by this process. The temperature of the melt usually is 100 or 200° above the melting point of the beryllium but below the boiling point thereof.

After impurities have been distilled from the molten mass the molten metal may be drained from the crucible and cast into suitable ingots. A further purification of this metal is thus secured since the nonvolatile impurities including oxides tend to form a scum or film particularly where the temperature of melting is maintained below the melting point of the respective oxide of the metal undergoing treatment. In such a case the oxide remains essentially solid or semi-solid and the metal flows from the oxide which in turn tends to adhere to the walls of the crucible or at least to separate substantially from the metal.

The metal obtained after this purification treatment is generally quite pure being substantially free from other metallic components and containing very little oxide. In most cases the purity of the metal will exceed 99.5 percent. Usually the impurities other than traces of oxygen which are present will not exceed 0.1 to 1 percent.

The following examples are illustrative.

*Example 1*

A cylindrical bomb 1½ inches in diameter and 12 inches long and constructed of iron was provided with a liner approximately ¼ inch thick of electrically fused dolomite. This liner was installed by placing a layer of the dolomite on the bottom of the bomb, centrally disposing a cylindrical wooden mandrel in the bomb and tamping the space between the bomb and the mandrel full of the dolomite. Thereafter, the bomb and liner were heated for two hours at 750° C.

When the bomb was cool the following charge was thoroughly mixed and placed therein:

| | Grams |
|---|---|
| Beryllium fluoride ($BeF_2$) | 200 |
| Sulphur | 132 |
| Magnesium metal | 155 |
| Calcium metal | 80 |

The beryllium fluoride was finely divided having an average particle size of about 200 mesh. Calcium and magnesium in the form of finely cut chips was used and the sulphur also was in a relatively fine state of division so that upon mixing an essentially uniform mixture was secured. After the charge was placed in the bomb a layer of calcined CaO was tamped on the top of the charge and the cover tightly fastened on the bomb. The bomb was placed in a furnace and heated to about 600° C. The reaction initiated in about 8 minutes and the pressure rose substantially above atmosphere pressure, probably several hundred pounds per square inch. Because of the violence of this reaction, proper precaution should be taken to avoid damage by explosion. The bomb was left in the furnace for about 30 minutes thereafter and it was then removed and allowed to cool. Upon cooling it was found that the beryllium metal had formed and collected at the base of the bomb in the form of a small well-bonded ingot.

*Example 2*

The process described in Example 1 was repeated using a sintered calcium oxide crucible in an iron bomb 2½ by 12 inches and using the folowing charge:

|   | Grams |
|---|---|
| Thorium fluoride | 250 |
| Beryllium fluoride | 5 |
| Iodine | 205 |
| Calcium | 121 |

The bomb was heated to 656° C. and the reaction initiated at this temperature. After cooling, it was found that a thorium-beryllium alloy which was quite malleable and quite resistant to corrosion was secured in the form of a massive ingot.

*Example 3*

The process of Example 2 was repeated using the following charge:

|   | Grams |
|---|---|
| Thorium fluoride | 500 |
| Beryllium fluoride | 382 |
| Iodine | 415 |
| Calcium | 625 |

A thorium-beryllium alloy was secured containing about 17 percent by weight beryllium and 83 percent by weight thorium. The product produced was hard and quite resistant to corrosion.

*Example 4*

A mixture was prepared as follows:

|   | Parts by weight |
|---|---|
| Calcium metal (10–50 mesh) | 1,040 |
| Beryllium fluoride (100–300 mesh) | 1,000 |
| Lead chloride (100–300 mesh) | 1,000 |

This mixture was placed in a reactor lined with CaO, a graphite cover placed on the charge and the reactor was closed and heated to about 600° C. After 33 minutes the reaction initiated and the temperature rose above 1000° C. and molten metal was formed. After several minutes the reactor was cooled. It was found that the lead had separated into a layer at the bottom of the reactor, the beryllium had separated into a layer in an upper portion of the reactor with the chloride-fluoride slag layer between the beryllium and lead layers. These layers were segregated.

The invention as herein described has been particularly concerned with the production of beryllium from the fluoride $BeF_2$. The process herein described may be applied to use in connection with the production of beryllium from its other halides, such as, the chloride, bromide or iodide. The hygroscopicity of some of these halides may be objectionable because the water contaminant thus introduced in the reaction materially reduces the yield of metal secured and makes the separation of the molten phases more difficult. In consequence it is preferred to conduct the reactions herein contemplated using beryllium fluoride. However, mixtures of fluoride and chloride may be used and in such a case increased fluidity in the slag permits more recovery of the metals produced. Moreover, beryllium chloride may be co-reduced with other metal halides such as zinc fluoride or thorium fluoride.

Although the present invention has been described with particular reference to the specific details of certain embodiments thereof it is not intended that such details shall be regarded as limitations upon the scope of the invention except insofar as included in the accompanying claims.

What is claimed is:

1. A method of preparing a metallic beryllium composition which comprises subjecting to reacting conditions a mixture comprising a reducing metal of the group consisting of alkali metals and alkaline earth metals, beryllium halide and sulphur, said reducing metal being used in an amount greater than the stoichiometric amount to react with beryllium halide and with sulphur and said sulphur being used in an amount sufficient to react with reducing metal to provide a temperature for the reaction mixture above the melting point of beryllium metal, maintaining said temperature to separate a molten beryllium phase and a molten slag phase containing halide of the reducing metal and a sulphide of the reducing metal, cooling to solidify said phases, and removing solidified beryllium.

2. The process of claim 1 wherein the reducing metal comprises calcium and magnesium.

3. A method of preparing a metallic beryllium composition which comprises subjecting to reacting conditions a mixture comprising a reducing metal of the group consisting of alkali metals and alkaline earth metals, beryllium fluoride and sulphur, said reducing metal being used in an amount greater than the stoichiometric amount to react with beryllium fluoride and with sulphur and said sulphur being used in an amount sufficient to react with the reducing metal to provide a temperature of the reactants above the melting point of beryllium, maintaining said temperature to separate a liquid beryllium phase and a liquid slag phase containing fluoride of the reducing metal and a sulphide of the reducing metal, cooling to solidify said phases, and separating solidified beryllium.

References Cited in the file of this patent

UNITED STATES PATENTS

| 1,648,954 | Marden | Nov. 15, 1927 |
| 1,740,857 | Kroll | Dec. 24, 1929 |
| 2,069,705 | Gadeau | Feb. 2, 1937 |

FOREIGN PATENTS

| 428,458 | Great Britain | Dec. 11, 1933 |
| 480,787 | Great Britain | Feb. 28, 1938 |

OTHER REFERENCES

Beryllium, Siemens-Konzein, translated by Rimbach and Michel (1932), pub. by Chemical Catalog Co., Inc., p. 38.

Thorpe's Dictionary of Applied Chemistry, 4th ed. (1943), vol. 6, p. 17, col. 2, pub. by Longmans.